United States Patent [19]
Elfström

[11] Patent Number: 5,302,074
[45] Date of Patent: Apr. 12, 1994

[54] WHEELED VEHICLE FOR GROUND TRANSPORT OF AIRCRAFT

[75] Inventor: Bo Elfström, Kalmar, Sweden
[73] Assignee: Kalmar Motor AB, Kalmar, Sweden
[21] Appl. No.: 861,550
[22] Filed: Apr. 1, 1992
[51] Int. Cl.⁵ .......................... B60P 3/06; B62D 49/02
[52] U.S. Cl. .................................. 414/427; 414/426; 180/904
[58] Field of Search .............. 414/426, 427, 429, 430, 414/428; 244/50; 180/14.7, 89.13, 904

[56] References Cited

U.S. PATENT DOCUMENTS

| | | | |
|---|---|---|---|
| 4,125,029 | 11/1978 | Krezak et al. | 180/904 X |
| 4,375,244 | 3/1983 | Morin | 414/429 X |
| 4,632,625 | 12/1986 | Schuller et al. | 414/429 |
| 4,911,603 | 3/1990 | Pollner et al. | 414/428 |
| 4,950,121 | 8/1990 | Meyer et al. | 414/428 |

FOREIGN PATENT DOCUMENTS 3318077 11/1984 Fed. Rep. of Germany .
9014269 11/1990 World Int. Prop. O. .......... 414/430

Primary Examiner—Michael S. Huppert
Assistant Examiner—Stephen Gordon
Attorney, Agent, or Firm—Nixon & Vanderhye

[57] ABSTRACT

A wheeled vehicle for transporting aircraft along the ground includes an engagement and hoisting unit supported by a vehicle chassis. The unit is brought into a position close to, but not touching, the nose wheels of the aircraft, both in front of and behind the contact points between the nose wheels and the ground. The unit is lifted by a cylinder acting between it and the chassis and makes contact with the treads of the nose wheels on both sides of the contact points, raising the nose wheels off the ground.

19 Claims, 3 Drawing Sheets

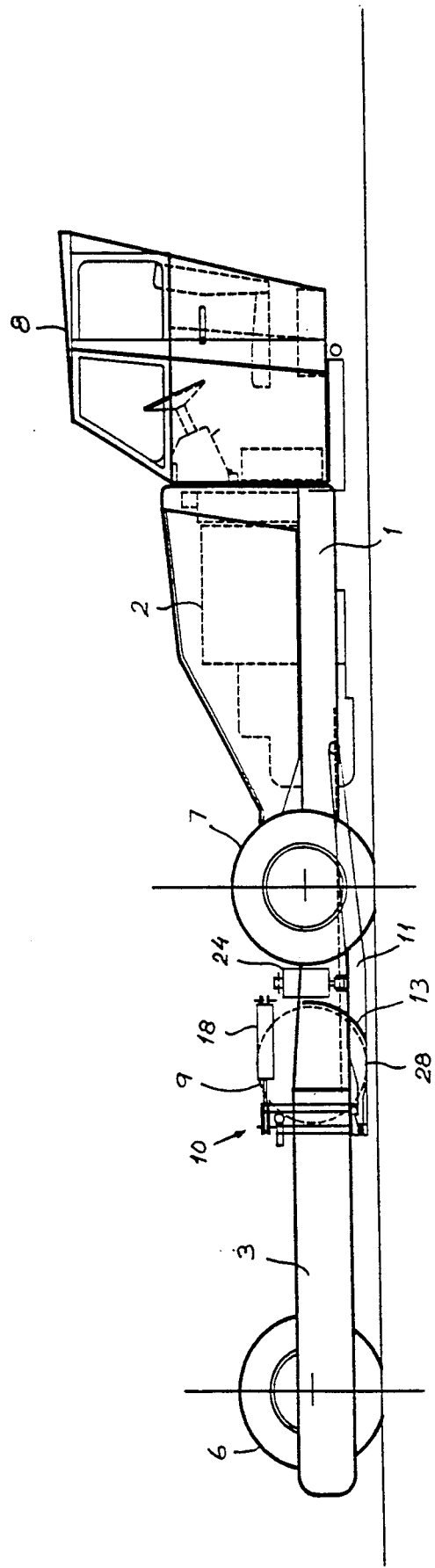

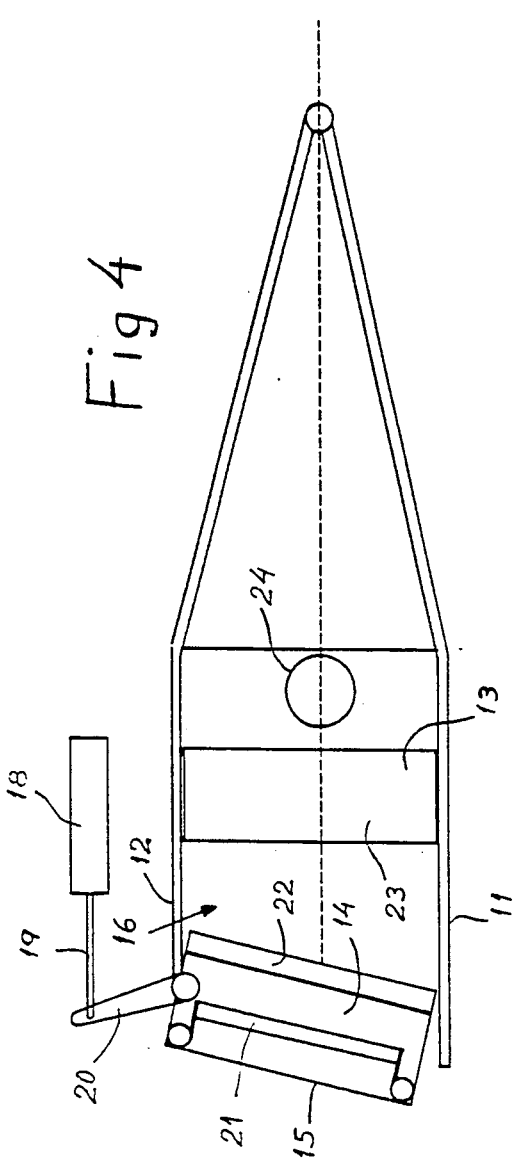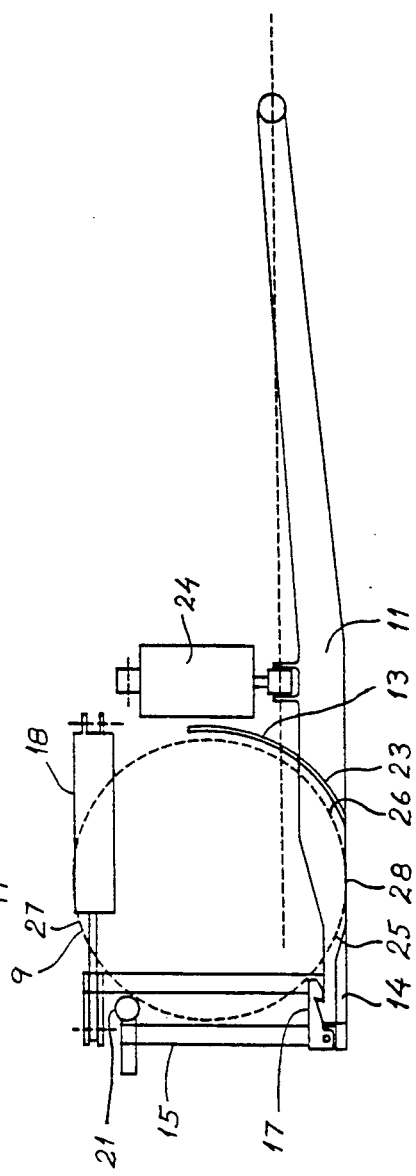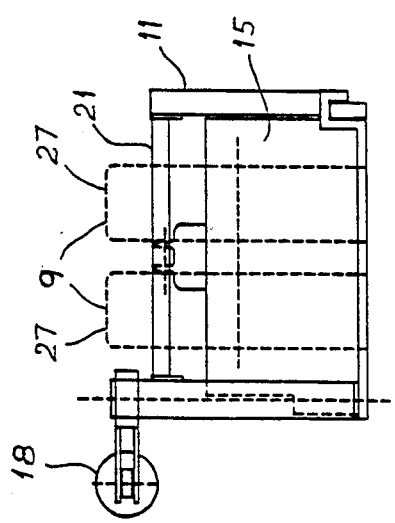

WHEELED VEHICLE FOR GROUND TRANSPORT OF AIRCRAFT

FIELD AND BACKGROUND OF THE INVENTION

The present invention relates to a wheeled vehicle for transporting aircraft along the ground.

It is known to use tow-vehicles with gripping devices operating with parallel telescopic arms provided with folding cross-pieces and engaging the nose wheels of the aircraft from behind and hydraulically pull the tow-vehicle towards the nose gear. The nose-gear wheels are thus drawn either towards a scoop-like device as suggested in German patent No. 3 318 077, or the nose wheels are drawn up on a sloping plane before being locked by the gripping arms so that they can be lifted.

SUMMARY OF THE INVENTION

The object of the invention is to provide an improved device in a vehicle for transporting aircraft on the ground, which enables the vehicle to be simply and quickly coupled to the aircraft without the latter being dislodged and without any parts having to be locked to the nose gear or its wheels prior to lifting and transport.

The present invention relates to a wheeled vehicle for transporting aircraft on the ground, comprising an engagement and hoisting unit supported by the chassis of the vehicle and arranged to be raised from a starting position in order, when in free surface contact with the nose-wheel tread on both sides of the contact point between nose wheels and ground, to be brought into releasable engagement with the nose wheels so that they are lifted simultaneously from the ground, said engagement and hoisting unit comprising two support arms spaced apart and defining a space between them to receive the nose wheels without their coming into contact with the side walls of said support arms; a stationary inner counter member with an inner concave support surface, arranged closed to ground level for engagement with lower portions of the nose wheels during said hoisting; a movable outer counter member disposed close to ground level for engagement with lower portions of the nose wheels located on the opposite side of said contact point between wheels and ground in relation to said lower portions for engagement of the fixed counter member; a lifting means arranged to lift the engagement and hoisting unit and nose wheels from the ground upon engagement of said counter members with the nose wheels; said engagement and hoisting unit comprising a gate carrying said outer counter member and being pivotably journalled about a vertical axis on one of the support arms and arranged to be moved between an open position in which the nose wheels can be received within the space of said engagement and hoisting unit without contact therewith, and a closed position in which the free end of said gate is located beside and secured to the other support arm to enclose the nose wheels in said space without contact; said outer counter member consisting of a horizontal plate with an inner, downwardly sloping support surface; said inner counter member being arranged by moving the vehicle in relation to the nose wheels to be brought into a starting position close to the nose wheels without touching them, in front of their point of contact with the ground; and said inner support surface of said horizontal plate being arranged, when the gate is in closed position to assume a starting position close to the wheels without touching them, behind their point of contact with the ground.

Besides the device according to the present invention being considerably simpler than said known tow-vehicles, it also has the advantage over them that it avoids the technically complicated problem of having two different hydraulically operated cylinders for the telescopic arms to move exactly uniformly. Furthermore, tow-vehicles with telescopic gripping arms must be manoeuvred straight in towards the centre of the nose gear while the arms are being retracted. If the nose gear is inclined it may be impossible to subsequently perform the locking and raising operations—the torsion link protruding between and behind the wheels on many types of aircraft is, for instance, a hinder. In the device according to the invention the prospective lifting position can be checked before the gripping member, i.e. the gate, is operated, thereby reducing the risk of damage. The use of the known tow-vehicles with telescopic gripping arms also implies that, while the gripping arms are being retracted, unless complicated precautions are taken, the nose gear is subjected to forces that may dislodge the aircraft if the brake is not engaged. For reasons of safety, therefore, the pilot or a mechanic should assist during the pulling—in stage (engage the brakes on the aircraft), thus entailing intervention in the current routines. In the case of aircraft parked at airline gates any movement inwards/forwards is more dangerous than a movement outwards/backwards. The use of tow-vehicles with telescopic gripping arms that utilize a rear scoop device on each gripping arm, similar to the construction described and shown in German patent No. 3 318 077, is limited to aircraft without deflectors—devices similar to mudguards, placed a few centimetres off the ground behind the wheels. The height of the scoop is limited to maximally about 4 cm but should preferably be less since it cannot otherwise be brought into contact with the tires. This greatly complicates the design of the rear end pieces on the gripping arms, or implies that the tow-vehicle cannot be used on any medium-sized Douglas aircraft (DC9/MD80), these constituting a considerable proportion of the aircraft now in use. For this reason the lower part of the gate in the device according to the present invention is in the form of a horizontal plate disposed close to ground level. Besides the complicated design of the gripping arm structure, the embodiment with telescopic gripping arms combined with inclined plane also requires the cross pieces of the gripping arms to be able to rotate during the phase of gripping when the nose wheels are pulled over, i.e. while rolling, onto the inclined plane. The nose gear will also be lifted quite considerably even during the gripping phase. If the aircraft is parked at a gate with the passenger bridge in contact with the area around the door of the aircraft, such a gripping operation cannot be performed for reasons of safety. The operation cannot therefore be commenced until the gate has been removed from the aircraft. The extra time incurred entails a deterioration of procedures both in comparison with the traditional procedure using a tractor tow-bar and with the procedure performed by the vehicle according to the present invention. There are several types of aircraft in which the nose-gear strut is not vertical. The lifting device must then be able to oscillate about a substantially horizontal axis in longitudinal direction of the tow-vehicle. The gripping arms, bulky even when collapsed, as well as the separate depressors required to prevent the nose gear from jumping out of position, must also be brought to execute the oscillatory movement. This can be achieved in a considerably simpler manner in the design according to the present invention in which gripping arms, cross-pieces and depressors are replaced by a simple gate.

BRIEF DESCRIPTION OF THE DRAWINGS

The invention will be described in more detail in the following with reference to the accompanying drawings.

FIG. 2 is a side view of the vehicle according to FIG. 1.

FIG. 3 is a side view of an engagement and hoisting unit according to an embodiment substantially corresponding to that in the vehicle according to FIG. 1.

FIG. 4 is a view from above of the engagement and hoisting unit shown in FIG. 3.

FIG. 5 is an end view of a gate included in the engagement and hoisting unit shown in FIGS. 3 and 4.

DETAILED DESCRIPTION OF THE DRAWINGS

Figure 1:
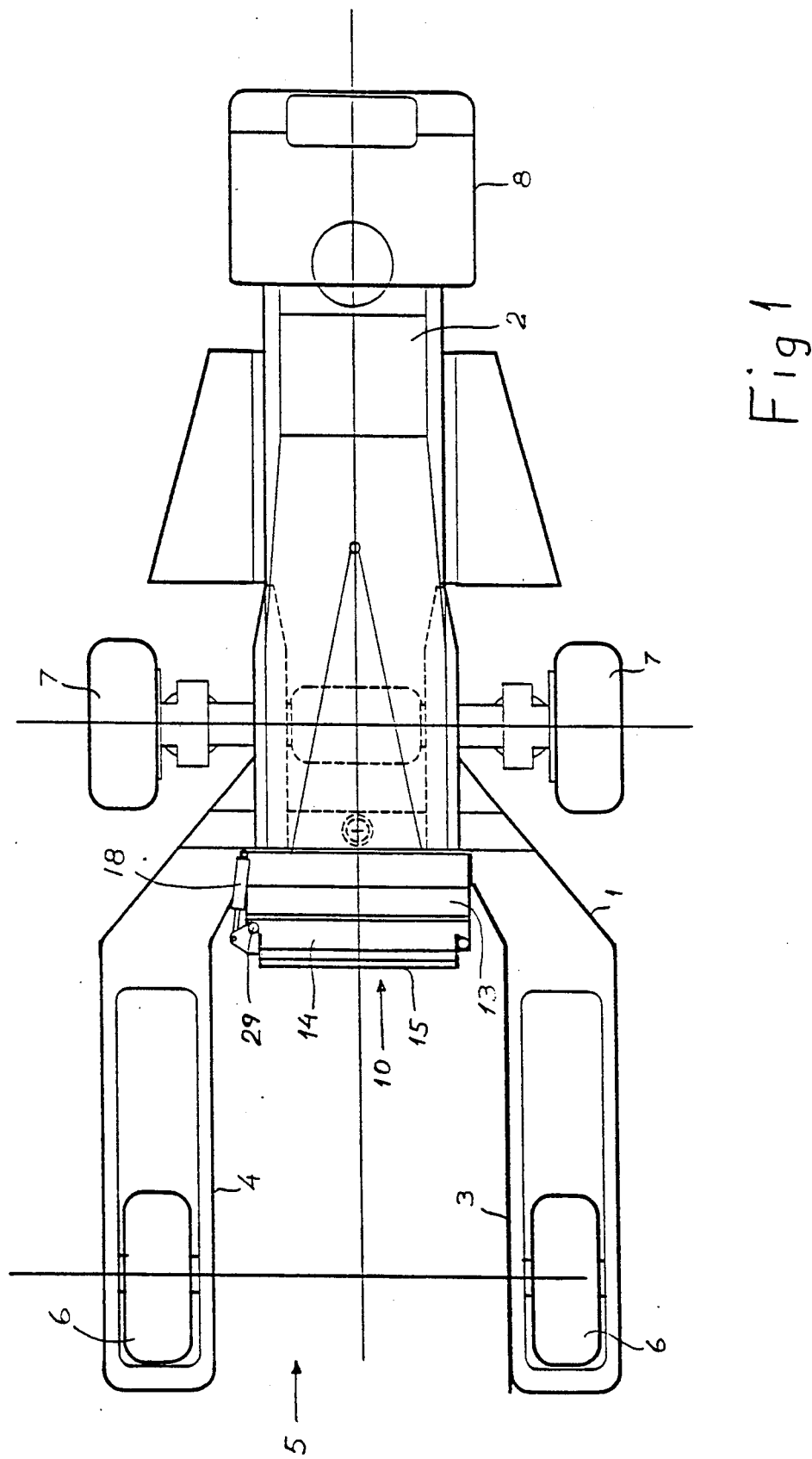
FIG. 1 is a view from above of a vehicle with an engagement and hoisting unit according to an embodiment of the invention.

FIGS. 1 and 2 show schematically a vehicle for transporting aircraft (not shown) relatively short distances along the ground. The vehicle has a chassis 1 with a motor 2 at one end and being provided at the other end with two longitudinal, horizontal beams 3, 4 disposed a predetermined distance from each other so that a sufficiently wide space 5 is formed between them, said space being open upwardly, downwardly and backwardly. The space 5 is thus open and accessible so that during a docking procedure the space 5 can receive the nose wheels of the nose gear of the aircraft when the vehicle is moved on its front and rear pairs of wheels 6, 7 in the longitudinal direction of the aircraft. The vehicle is provided with a cabin 8 for the driver and operating equipment. The operating equipment may include wire-guiding means enabling the driver to walk beside or behind the vehicle in order to provide a better overall view of the docking procedure and subsequent towing. According to the present invention the vehicle is equipped with a special device to bring it into freely supporting engagement with the nose wheels 9 as the only point of engagement, the rest of the vehicle thus having no contact or engagement with the nose gear. The device shown comprises an engagement and hoisting unit 10 which is located in the space 5 and is pivotably journalled, as indicated at reference numeral 30 in FIG. 3, to the chassis 1. The engagement and hoisting unit 10 comprises two spaced support arms 11, 12 disposed on the inner sides of the beams 3, 4, and a counter member 13 rigidly connected to the support arm 11, 12 and having an inner, concave support surface with a radius substantially corresponding to the radius of the nose wheels. The engagement and hoisting unit 10 is also provided with a movable outer counter member 14 carried by a gate 15 arranged to close the space 16 between the support arms 11, 12. The gate 15 is pivotably suspended on a vertical pole 29 on one support arm 12 enabling it to be swung about a vertical axis from an open position when it extends along one chassis beam, to a closed position when the free end of the gate 15 is located in the vicinity of the other support arm 11 and can be locked in place by means of a suitable locking device 17, e.g. a latch that can be dropped into a groove in the support arm 11. The swinging movement of the gate is achieved with the aid of a pneumatic or hydraulic cylinder 18, the piston rod 19 thereof being pivotably connected to a link arm 20 which is in turn rigidly connected, i.e. fixed to the gate 15. The gate is provided with an upper support 21, vertically adjustable (by any suitable means—see reference numeral 31 in FIG. 3) and suitably in the form of a horizontal bar. The bar 21 is arranged to be brought into abutment with upper parts of the nose wheels 9. The outer counter member 14, movable together with the gate 15, comprises a horizontal plate having a support surface 22 arranged opposite the lower part of the inner, concave support surface 23 of the inner counter member 13. When the vehicle has been driven into position in front of the nose wheels 9, the driver opens the gate 15 and drives the vehicle further forward so that the beams 3, 4 straddle the nose wheels 9, the wheels thus being accomodated in the space 5. The vehicle is moved so far in a first stage that the nose wheels 9 are located between the support arms 11, 12 and at a distance of about 300-100 mm from the concave support surface 23 of the stationary inner counter member 13. There is sufficient space between the support arms 11, 12 for the centre line of the nose wheels 9 to be displaced approximately ±70 mm from the centre line of the engagement and hoisting unit 10. In a second stage the vehicle is then moved slowly so that the distance between the concave support surface 23 of the inner counter member 13 and the nose wheels 9 is reduced to approximately 3 mm. This distance is not critical but it is neither necessary nor desirable for the nose wheels 9 to come into contact with said support surface 23. The gate 15 is then closed with the aid of the cylinder 18 and secured in closed position by means of the locking device 17. The engagement and hoisting unit 10 then hoists the nose wheels 9 with the aid of a hydraulic cylinder 24, whereupon the inner counter member 13 and plate 14 are brought into free-supporting engagement with facing lower portions 25, 26 of the nose-wheel treads 27 located on both sides of the point of contact 28 with the ground. The nose wheels 9 will thus be raised about 15-30 mm off the ground in the case of an aircraft with vertical nose gear and about 90 mm in the case of an aircraft with inclined nose gear. The aircraft is now ready for towing to the desired position where the tow-vehicle's engagement and hoisting unit 10 is released from the nose wheels by performing the procedure described above in the reverse order.

That which is claimed is:

1. A wheeled vehicle for transporting aircraft on the ground, said aircraft having nose wheels with front and rear ends and a predetermined width, said nose wheel further initially making contact with the ground at contact points, said vehicle comprising:
   a chassis mounted on wheels; and
   an engagement and hoisting unit mounted to said chassis, said unit comprising:
   first and second substantially parallel support arms spaced apart a distance greater than the width of the nose wheels, and defining a nose wheels-receiving volume between them;
   an inner counter member mounted by and substantially stationary with respect to said support arms; and inner counter member having a concave support surface with a lower portion thereof terminating in a leading edge disposed at or just above the ground at the front ends of the nose wheels;

an outer counter member including a horizontal plate with a downwardly sloping support surface terminating in a leading edge disposed at or just above the ground at the rear ends of the nose wheels;

means for mounting said outer counter member to said first arm for rotation about a substantially vertical axis from a first horizontal position in which said outer counter member allows substantially free passage of the nose wheels into said nose wheels-receiving volume, to a second horizontal position in which said outer counter member blocks passage of the nose wheels out of said nose wheels-receiving volume;

means for lifting said counter members with respect to the ground from a first vertical position in which said counter members are at or spaced a first distance from the ground and said outer counter member is in said second horizontal position, to a second vertical position in which said counter members engage the nose wheels received in said nose wheels-receiving volume and are spaced a second distance from the ground greater then said first distance and sufficient to lift the nose wheels engaged by said counter members off the ground; and said leading edges of said inner and outer counter members being spaced from each other a distance slightly greater than the length of a chord of the nose wheels when said outer counter member is in said second horizontal position and said counter members are in said first vertical position so that said counter members are adjacent the nose wheels at the front and rear ends but do not touch the nose wheels.

2. A vehicle as recited in claim 1 wherein said outer counter member further comprises a gate and a horizontal upper support, said gate carrying said downwardly sloping support surface and said upper support so that said upper support is vertically spaced from said downwardly sloping support surface a distance greater than the radius of the nose wheels, and wherein said gate is pivotally attached to said first support arm.

3. A vehicle as recited in claim 2 wherein said upper support is adjustable mounted on said gate for movement to adjust the vertical spacing thereof with respect to said downwardly sloping support surface.

4. A vehicle as recited in claim 3 wherein said unit is pivotally journalled to said chassis.

5. A vehicle as recited in claim 4 wherein said means for lifting said counter members comprises a hydraulic cylinder.

6. A vehicle as recited in claim 2 further comprising power means for pivoting said gate about said vertical axis to move said outer counter member between said first and second horizontal positions.

7. A vehicle as recited in claim 6 wherein said power means comprises a pneumatic or hydraulic cylinder mounted to said gate and to said chassis.

8. A vehicle as recited in claim 2 further comprising latch means mounted on said gate and said second support arm for releasably latching said outer counter member in said second horizontal position, said latch means comprising a pivoted latch on said gate and a latch receiving groove in said second arm.

9. A vehicle as recited in claim 1 wherein said unit is pivotally journalled to said chassis.

10. A vehicle as recited in claim 9 wherein said means for lifting said counter members comprises a hydraulic cylinder.

11. A vehicle as recited in claim 1 further comprising latch means for releasably latching said outer counter member in said second horizontal position, said latch means comprising a groove in said second arm and a pivoted latch.

12. A vehicle as recited in claim 1 wherein said concave support surface of said inner counter member has an arcuate extent of about 90°.

13. A wheeled vehicle for transporting aircraft on the ground, said aircraft having nose wheels with front and rear ends and a predetermined width, said nose wheels further initially making contact with the ground at contact points, said vehicle comprising:

a chassis mounted on wheels; and an engagement and hoisting unit mounted to said chassis, said unit comprising:

first and second substantially parallel support arms spaced apart a distance greater than the width of the nose wheels and defining a nose wheels-receiving volume between them;

an inner counter member mounted by and substantially stationary with respect to said support arms and terminating in a leading edge disposed at or just above the ground at the front ends of the nose wheels;

an outer counter member including a bottom support surface terminating in a leading edge disposed at or just above the ground at the rear ends of the nose wheels, a gate, and a horizontal upper support, said gate carrying said bottom support surface and said upper support so that said upper support is vertically spaced from said bottom support surface a distance greater than the radius of the nose wheels;

means for mounting said gate to said first arm for rotation about a substantially vertical axis from a first horizontal position in which said outer counter member allows substantially free passage of the nose wheels into said nose wheels-receiving volume, to a second horizontal position in which said outer counter member blocks passage of the nose wheels out of said nose wheels-receiving volume;

means for lifting said counter members with respect to the ground from a first vertical position in which said counter members are at or spaced a first distance from the ground and said outer counter member is in said second horizontal position, to a second vertical position in which said counter members engage the nose wheels received in said nose wheels-receiving volume and are spaced a second distance from the ground greater then said first distance and sufficient to lift the nose wheels engaged by said counter members off the ground; and said leading edges of said inner and outer counter members being spaced from each other a distance slightly greater than the length of a chord of the nose wheels when said outer counter member is in said second horizontal position and said counter members are in said first vertical position so that said counter members are adjacent the nose wheels at the front and rear ends but do not touch the nose wheels.

14. A vehicle as recited in claim 13 wherein said upper support is adjustably mounted on said gate for movement to adjust the vertical spacing thereof with respect to said bottom support surface.

15. A vehicle as recited in claim 13 wherein said unit is pivotally journalled to said chassis.

16. A vehicle as recited in claim 15 wherein said means for lifting said counter members comprises a hydraulic cylinder.

17. A vehicle as recited in claim 13 further comprising power means for pivoting said gate about said vertical axis to move said outer counter member between said first and second horizontal positions.

18. A vehicle as recited in claim 17 wherein said power means comprises a pneumatic or hydraulic cylinder mounted to said gate and to said chassis.

19. A vehicle as recited in claim 13 further comprising latch means mounted on said gate and said second support arm for releasably latching said outer counter member in said second horizontal position, said latch means comprising a pivoted latch on said gate and a latch receiving groove in said second arm.

* * * * *